United States Patent [19]

Hamaekers et al.

[11] Patent Number: 4,840,359
[45] Date of Patent: Jun. 20, 1989

[54] ENCAPSULATED RUBBER CUSHION

[75] Inventors: Arno Hamaekers, Gorxheimertal; Axel Rudolph, Darmstadt, all of Fed. Rep. of Germany

[73] Assignee: Firma Carl Freudenberg, Weinheim, Fed. Rep. of Germany

[21] Appl. No.: 181,558

[22] Filed: Apr. 14, 1988

[30] Foreign Application Priority Data

Jul. 23, 1987 [DE] Fed. Rep. of Germany ....... 3724432

[51] Int. Cl.⁴ .............................................. F16F 13/00
[52] U.S. Cl. ............................ 267/140.1; 267/219; 267/140.2; 267/141.2; 267/153; 267/292
[58] Field of Search ............... 267/140.1, 140.2, 141.7, 267/141.3, 141.4, 141.5, 141.6, 152, 153, 292–294, 279–282, 35, 141.2, 219–220; 248/562, 636, 631, 609, 578, 575; 403/225–228; 180/300, 312

[56] References Cited

U.S. PATENT DOCUMENTS

| 2,256,752 | 9/1941 | Saurer | 267/141.5 |
|---|---|---|---|
| 2,658,710 | 11/1953 | Titus | 267/141.7 |
| 2,706,126 | 4/1955 | Thiry | 267/141.3 X |
| 2,959,437 | 11/1960 | Piragino | 267/141.3 X |
| 3,028,665 | 4/1962 | Hirst | 267/141.4 X |
| 3,685,772 | 8/1972 | Giaccone | 267/141.3 |
| 4,183,496 | 1/1980 | Brock et al. | 267/141.4 X |
| 4,471,935 | 9/1984 | Chiba et al. | 267/141.2 X |
| 4,489,921 | 12/1984 | Martin | 267/141.5 |
| 4,728,086 | 3/1988 | Ishiyama et al. | 267/35 X |
| 4,762,310 | 8/1988 | Krajewski et al. | 267/141.2 |

FOREIGN PATENT DOCUMENTS

| 9120 | 4/1980 | European Pat. Off. | |
| 3722079 | 1/1988 | Fed. Rep. of Germany | 267/219 |
| 0063141 | 5/1981 | Japan | 267/141.2 |
| 0081249 | 5/1983 | Japan | 267/141.2 |
| 0168931 | 9/1985 | Japan | 267/140.1 |
| 0175836 | 9/1985 | Japan | 267/140.1 |
| 0206838 | 9/1986 | Japan | 267/219 |

*Primary Examiner*—Douglas C. Butler
*Attorney, Agent, or Firm*—Felfe & Lynch

[57] ABSTRACT

An encapsulated rubber cushion loaded mostly perpendicularly to its axis, in which two sleeves, one radially inside the other, are bonded together by a resilient body of rubber. The resilient body contains fluid-filled chambers which are connected at least partially by connecting openings. The dividing walls of the resilient body which separate the chambers from one another have from their manufacture a breadth which exceeds their installed breadth. They thus join the ready-to-use encapsulated rubber cushion in a resiliently compressed state.

15 Claims, 8 Drawing Sheets

ENCAPSULATED RUBBER CUSHION

The invention relates to an encapsulated rubber cushion loaded mostly perpendicular to its axis, including two sleeves with one surrounding the other in a parallel relationship, and a resilient body of rubber disposed between them which contacts the outer of the two sleeves with webs projecting substantially in the radial direction the webs being in a mirror-image relationship to an imaginary perpendicular plane erected on the axis of the sleeve and defining, together with terminal walls and the outer of the two sleeves, chambers filled at least partially with liquid, which are connected together at least partially by connecting openings.

An encapsulated rubber cushion of the above-described kind is disclosed in EP-OS 9,120. The resilient body, comprising rubber, is affixed by vulcanization to both of the sleeves which surround one another and as result of the cooling that follows the vulcanization, leads to the occurrence of shrinkage tensions, especially in the webs that separate the chambers from one another. These shrinkage tensions, on which other tensions can be superimposed undesirably in the event of the introduction of vibrations of great amplitude, can adversely affect the practical properties and the useful life of the previously known encapsulated rubber cushions.

The invention is addressed to the problem of presenting an encapsulated rubber cushion in which no appreciable tensile stresses are present within the resilient body during use.

This problem is solved according to the invention in that the webs between the two sleeves are resiliently compressed on a breadth which is less than the breadth in which they were manufactured.

The resilient body of the supporting sleeve according to the invention, which comprises rubber, is bonded by vulcanization only to the inner sleeve and this permits its radially outwardly projecting parts and especially the webs to be compressed before or during insertion into the outer of the two sleeves to a breadth that is substantially smaller than their manufactured breadth. In addition to canceling the negative shrinkage tension caused by cooling after vulcanization, it therefore becomes possible to produce positive compressive tensions in the rubber body of the ready-to-use rubber cartridge spring, which permits the achievement of uniform properties of use over an especially long time of use. The compression of the resilient body is on the one hand to be at least so great that the shrinkage tensions produced in manufacture are eliminated, but on the other hand it is not to exceed levels at which damage or destruction of the resilient body is to be expected during the proper use of the encapsulated rubber cushion. The degree of compression that is applied in a particular case is expressed by the linear compression. It can be computed according to the formula $\Delta_L/L$ in which $\Delta_L$ represents the shortening of the resilient body in a particular direction, and L the corresponding length in the uncompressed state.

In cases in which the webs of the resilient body are defined axially of the encapsulated rubber cushion exclusively by surfaces perpendicular to its axis, the compression is performed as a rule only in the radial direction. The linear compression is found in this case on the basis of the reduction of the breadth in the radial direction.

The case is different when the resilient body is in a shape from its manufacture in which each web or web portion is defined axially at both ends by surfaces sloping in the same manner, which during the performance of the compression are turned over such that they then are in a substantially perpendicular relationship to the axis of the encapsulated rubber cushion. The linear compression is determined in this case on the basis of the actual reduction in length of the sloping surfaces, which the latter undergo during their transfer to a position in which they are disposed perpendicularly to the axis of the encapsulated rubber cushion.

Any of the kinds of rubber used in such applications can be used in the manufacture of the resilient body, preferably of a kind having a Shore A hardness of 30 to 80.

The linear compression, in applications in which a static load does not have to be carried, should be between 5 and 10%. In this case not only a long life but also an especially good isolation of the vibration is achieved.

In applications in which, on the other hand, the achievement of an improved damping action against vibration is more important, as well as an increased stiffness in regard to the interrelationship between the sleeves, it has proven advantageous to apply a greater linear compression, levels of 20 to 40% being easily achievable. Alternating loads from opposite directions are reliably absorbed by such designs, with the avoidance of undesirable tensions in any part of the resilient body. The use of such encapsulated rubber cushions is therefore recommendable particularly in cases in which extreme load situations are to be expected, as for example in the suspension of the axles of motor vehicles.

The resilient body is to be compressed such that the resultant bias that is achieved will be opposed to the static initial load that is to be borne under operating conditions. From this point of view the resilient body and especially the webs are best compressed in the radial direction if the forces to be accommodated are applied mostly in a radial direction. The relationship of the webs to one another and to the direction of application of the forces as well as the dimensions of the webs are relatively simple to calculate in such a configuration, taking into consideration the elasticity of the rubber body, the direction of the application of the forces, ad the magnitude of the forces actually applied. As a substitute, an axial compression of the resilient body is also possible. It is recommended in cases in which the statically acting initial load is applied in the axial direction. Combined configurations in which the webs are compressed both in a radial and in an axial direction are preferred. They are universally usable and make it possible to absorb forces applied in a slanting direction and to damp in a controlled manner vibrations superimposed on such forces. The sleeves have as a rule a rotationally symmetrical cross section. Other configurations are possible and are recommended especially in cases in which the conditions of installation or the desired kind of elasticity require it.

The webs can be so configured and/or disposed that the resultant force (R1) caused by the compression, which is opposed to the static loading, is greater than the resultant force (R2) caused by the compression which is acting in the direction of the load that is to be accommodated. The difference between R1 and R2 is to be as near as possible to the magnitude of the static load that is to be accommodated.

If a resilient body is used whose webs as manufactured terminate in surfaces which envelop the axis of the inner sleeve at identical intervals, a ready-to-use encapsulated rubber cushion is obtained in this case, in which the axis of the inner sleeve is shifted upwardly relative to the direction of the static initial load that is to be accommodated, i.e., vertically upwardly relative to the axis of the outer sleeve. The loading introduced into the inner sleeve as a result of the static initial load, e.g., from loading applied from above, is thereby compensated in such a manner that identity in the mutual disposition of the two axes of the sleeves will result. The relative movability of the two sleeves is thus compensated in every direction, which makes it possible to dispense with the use of secondary springs. Also, an important simplification results in regard to the assembly of rubber cushions configured in this manner insofar as the correct relationship of the encapsulated rubber cushions to the direction of the load to be supported can easily be seen from the relative position of the inner sleeve to the outer sleeve. The use of frequently overlooked marking can therefore be eliminated.

The outer of the two sleeves comprises also, as a rule, a tube. With a view toward simplifying the insertion of the webs, which is performed by forcing them in the axial direction, it has been found advantageous to provide the webs with metal facings on the surfaces facing radially outward. These can be made of sheet metal and are best adapted on their outer side to the shape of the inside of the outer sleeve.

The webs can be affixed externally in the area of their end walls to metal end rings which in the finished encapsulated rubber cushion are covered on the side facing away from the webs by inwardly directed portions of the outer sleeve.

The end rings have an outside diameter that is substantially identical with the inside diameter of the outer sleeve. They assure an especially shape-stable relationship between the separately made components of the encapsulated rubber cushion according to the invention. The end rings together with the outer sleeve can define segments of annular channels, the annular channels forming a component of the connecting openings which connect together, in a fluid conducting manner, at least two different chambers of the encapsulated rubber cushion according to the invention. It is quite obvious that care must be taken to provide a good sealing of the end rings against the outer sleeve; this can be accomplished, for example, by means of a rubber sealing lip which, during the fixation in the outer sleeve, is permanently pressed under a bias against the surfaces that are to be sealed. A surface coating of rubber can also be provided, if desired, on the other portions of the surface of the end rings and can here prevent the occurrence of corrosion phenomena. It will best form an integral component of the resilient rubber body.

The plates terminating the outer edge of the webs can be integrated with at least one of the end rings. The correct alignment with the webs during their manufacture and solidification can be substantially simplified in this manner. The webs can have a greater radial breadth as manufactured, in the middle part of their axial length than in the area of the ends, resulting in a later compression in the middle part of the encapsulated rubber cushion. A conical enlargement of the radial breadth toward the middle part of the axial length of the encapsulated rubber cushion has proven especially desirable, and can be installed with especial ease in an outer sleeve which is divided approximately in the center of its axial length.

The webs disposed below the center line of the inner sleeve, in the static loading direction, can have a greater width circumferentially than the webs disposed above the center line, which makes it possible to achieve an especially great difference between the upwardly directed resultant force (R1) and the downwardly directed resultant force (R2). An encapsulated rubber cushion constructed accordingly is therefore distinguished, in a loaded state in which the center lines of the inner and outer sleeves coincide, by especially great carrying capacity.

The optimum arrangement of the four webs that are present as a rule can be determined by experiment. For applications in the area of motor vehicle axle suspensions, however, it has been found desirable for the lower webs to be at an angle of 30° to 60° from one another and the upper webs at an angle of 120° to 150°. In addition to a good carrying capacity in the vertical direction, this arrangement provides a guidance of the inner sleeve in the outer sleeve that is excellent in this area of application, and this is a great advantage. The webs of the encapsulated rubber cushion according to the invention can also be produced in the form of web portions which have an outwardly increasing distance apart in the radial direction, this distance being substantially closed up by an axial drawing together of the web portions in the encapsulated rubber cushion when it is ready for operation. It is desirable for the substantially V-shaped gap between each pair of web portions to be approximately in the middle of the length of the webs. In this case the stiffness of the encapsulated rubber cushion in the axial direction is balanced in both directions.

In other applications it may be advantageous to have different stiffnesses in each axial direction. Such an effect can be achieved by shifting the gap axially away from the center of the encapsulated rubber cushion or by associating its V-shaped profile with the encapsulated rubber axle cushion.

In accordance with the invention, an encapsulated rubber cushion having a longitudinal axis and adapted to be stressed chiefly perpendicular to its axis comprises two sleeves one around the other in an axially parallel relationship and a resilient body of rubber disposed between them which contacts the outer of the sleeves with at least two webs projecting substantially in the radial direction. The webs are associated with an imaginary perpendicular plane erected in the axis of the sleeves and together with the terminal end walls and the outer of the sleeves define at least partially liquid-filled chambers which are connected at least partially by connecting openings. The webs are compressed together resiliently between the two sleeves to a breadth that is smaller than the breadth in which they were manufactured.

For a better understanding of the invention, together with other and further objects thereof, reference is made to the following description, taken in connection with the accompanying drawings, and its scope will be pointed out in the appended claims. Referring now to the drawings:

Figure 1:
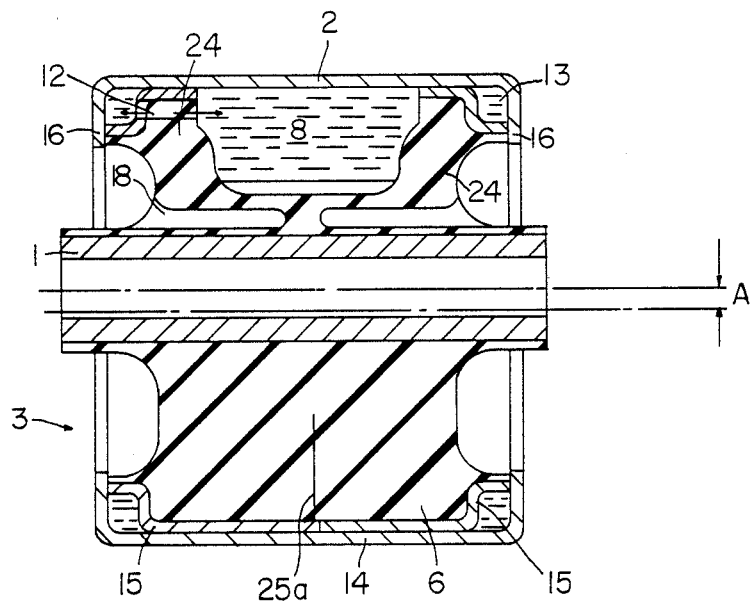
FIG. 1 shows an encapsulated rubber cushion of the kind according to the invention in longitudinal cross section, taken along line A—A of FIG. 2.
Figure 2:
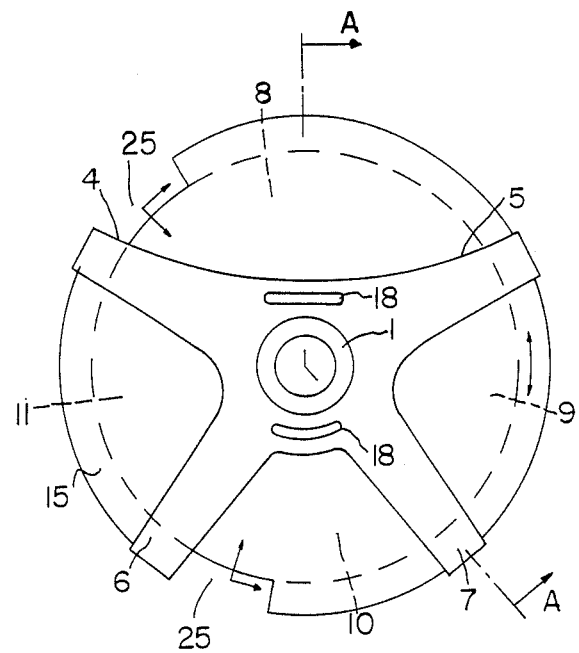
FIG. 2 is an end view of the resilient body removed from the outer sleeve according to FIG. 1, including the inner sleeve.

Referring now more particularly to FIGS. 1 and 2, the encapsulated rubber cushion represented in FIGS. 1 and 2 comprises the resilient body 3 of rubber, which is bonded by vulcanization to the inner sleeve 1 and is inserted into the outer sleeve 2 by radial compression. The inner and outer sleeves 1 and 2 comprise tubes of metal. They serve for the connection of secondary machine parts t the represented encapsulated rubber cushion, for example of the parts connecting the axle of a motor vehicle on the one hand and the body of the vehicle on the other. The rubber used in making the resilient body 3 preferably is of an ordinary type, having a Shore A hardness of 50.

The tubes have a rotationally symmetrically defined profile.

The use of tubes with a different profile is, however, also possible, such as a triangular, tetragonal, pentagonal or hexagonal profile, a circular or oval profile, or transitional forms between at least two of the above-named profile shapes.

The resilient body 3 has four essentially outwardly projecting webs of which webs 4 and 6 can be seen in FIG. 1. The webs together with the outer sleeve 2 and the end walls 24 enclose liquid-filled chambers of which chamber 8 can be seen in FIG. 1 and all chambers 8, 10, 9, 11 in FIG. 2. The chambers 8 and 10 are connected by a connecting opening 12 of which a portion is configured in the manner of an annular channel and in this portion it is surrounded on the one hand by the limb of the end ring 15 and on the other hand by the oppositely bent limb 16 of the outer sleeve 2. Cutouts 25 in the outwardly pointing limb of the corresponding end ring 15 assure the passage of liquid between the channel and the chambers 8 and 10, respectively. Between the two, liquid can therefore be moved back and forth to achieve a damping action whenever a relative displacement of the inner sleeve 1 in the outer sleeve 2 is produced.

An annular channel 13 acting in the same manner is present at the opposite axial end of the encapsulated rubber cushion. This one connects the left chamber 11 with the chamber 9 disposed on the right in the same horizontal plane. The walls 24 forming the sides of the chambers are of a resilient nature. Upon the introduction of low-frequency vibrations of great amplitude, the consequence will be a pressure difference in the individual chambers of the encapsulated rubber cushions, which will result in the forcing of liquid through the connecting opening that joins the chambers and in the achievement of a great damping action. The isolation of high-frequency vibrations of low amplitude, however, is performed by the thin membrane walls which separate the recesses 18 from the chambers 8 and 10. Not only can the recesses be blind recesses but they can also run all the way through, and in either case their length transversely of the direction of application of the force, in conjunction with the distance between the walls opposite one another in the direction of application of the force, will ultimately define the magnitude of the low amplitude of isolated vibrations and distinguish it from the great amplitude of damped vibrations. The resultant properties with regard to the isolation of high-frequency vibrations are accordingly just as excellent as the damping properties with regard to low-frequency vibrations. The liquid in the encapsulated rubber cushion is a mixture of glycol and water. The metal parts of the encapsulated rubber cushions are therefore provided with a corrosion-preventing surface coating for the prevention of corrosion, preferably one on a basis of rubber.

In an embodiment which is not shown in the drawing and is similar to the one described above, provision is made for defining the ends of the chambers 8 and 10, which are situated opposite one another in the direction of the application of force, with resilient end walls 24 of a thin, membrane-like nature. Such a configuration is recommended for applications in which the vibrations introduced in the direction of application of force need greater damping than vibrations which are introduced into the encapsulated rubber cushions crosswise this direction. An instance of such an application is one in which road-induced vibrations in a perpendicular direction are introduced into the encapsulated rubber cushions, and high-frequency, motor-induced vibrations of low amplitude crosswise that direction. In this embodiment, the motor-induced vibrations cannot result in the occurrence of important pressure differences in the chambers situated opposite one another transversely of the direction of introduction of the force. With regard to vibrations of great amplitude introduced in the perpendicular direction, the damping effect described above is produced, which is based on the forcing of liquid components through the connecting opening between the chambers 8 and 10 which are situated perpendicularly one above the other.

The shape of the resilient rubber body as produced by its manufacture is represented in FIG. 2. It shows in an end view the resilient body, represented in the assembled state in FIG. 1, in the shape it has when removed from the outer sleeve 2. It can be seen that the radial reach of the webs 4, 5, 6 and 7 exceeds that of the partially drawn end ring 15. This ring has an outside diameter which is identical to the inside diameter of the outer sleeve 2. The insertion of the resilient body shown into the outer sleeve thus calls for a radial compression and consequently a positive bias in the resilient body 3 and especially in the webs 4, 5, 6 and 7. Stability over the long term is thereby substantially increased in the assembled state. It is furthermore to be seen that the webs 4, 5, 6 and 7 are associated in a mirror-image relationship with an imaginary perpendicular plane through the axis of the inner sleeve 9.

Figure 3:
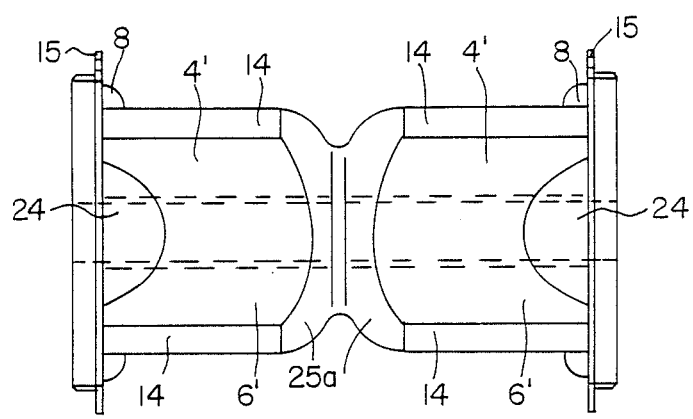
FIG. 3 is a sectional view of the resilient body shown in FIG. 2.

The webs 4 and 5 that are above the center line of the inner sleeve 1 together enclose a wider angle than the lower webs 6 and 7. The latter additionally have a greater extent in the circumferential direction than the webs 4 and 5. The radial length is the same in all cases. The plates 14 terminating the webs 4, 5, 6 and 7 after their manufacture are therefore at the same distance from the inner sleeve 1 before they are introduced into the outer sleeve 2. This situation changes upon insertion into the outer sleeve 2. This is because, in this procedure, identical forces are applied radially to each of the webs 4, 5, 6 and 7, which, due to the flatter angle between the webs 4 and 5 in comparison to the angle between the webs 6 and 7, and on account of the greater cross section of the latter, produces an upwardly vertical displacement A (FIG. 1) of the inner sleeve 1 relative to the outer sleeve 2. This effect is utilized according to the invention to compensate the static load applied vertically onto the inner sleeve 1; this will result if the relationship of the webs 4, 5, 6 and 7 to the circumference is correct, and if the interrelationship of the cross sections is correct. Thus, a completely concentric association between the two sleeves 1 and 2 can easily be achieved under the action of the applied load. FIG. 1 shows the encapsulated rubber cushion in the unloaded state. The relative displacement A of the sleeves due to the compression of the resilient body is also shown. In FIG. 3, the resilient body 3 shown in cross section in FIG. 2 is represented in a side view. This is intended to make it clear that the resilient body is so produced that the webs 4, 5, 6 and 7 are each composed of portions 4′, 5′, 6′ and 7′ which, approximately in the center part of their axial length, are separated from one another axially by an amount that increases radially outwardly.

The separation is substantially eliminated during the insertion of the resilient body into the outer sleeve, so that then the confronting surfaces 30 of the web portions 4′, 5′, 6′ and 7′ come into a mutual sealing contact. In the assembled state of the resilient body in the outer sleeve, therefore, liquid can not pass through the gap formed by the separation, at least not to an extent interfering with operation. The gap is preferably entirely sealed up, which can be accomplished by pressing together the surfaces 30 of webs 4′, 5′, 6′ and 7′, which confront one another in the axial direction. The simplest way to achieve such an effect is to coordinate the length, as manufactured, of the resilient body 3 consisting of rubber with the axial length of the outer sleeve 2 which will finally contain the resilient body. The end walls 24 are convexly curved inwardly in the as-manufactured form represented in the drawing. Like the partial webs 4′, 5′, 6′ and 7′ they also undergo a deformation during the installation of the resilient body into the outer sleeve 2, to assume substantially the shape shown in FIG. 1. The web portions 4′, 5′, 6′ and 7′ are provided on their edges facing outwardly in the radial direction with metal facings 14. These are made of sheet metal and have a slightly smaller length than the web portions 4′, 5′, 6′ and 7′. They are radially adapted on their outer side to the shape of the inside wall of the outer sleeve 2.

Figure 4:
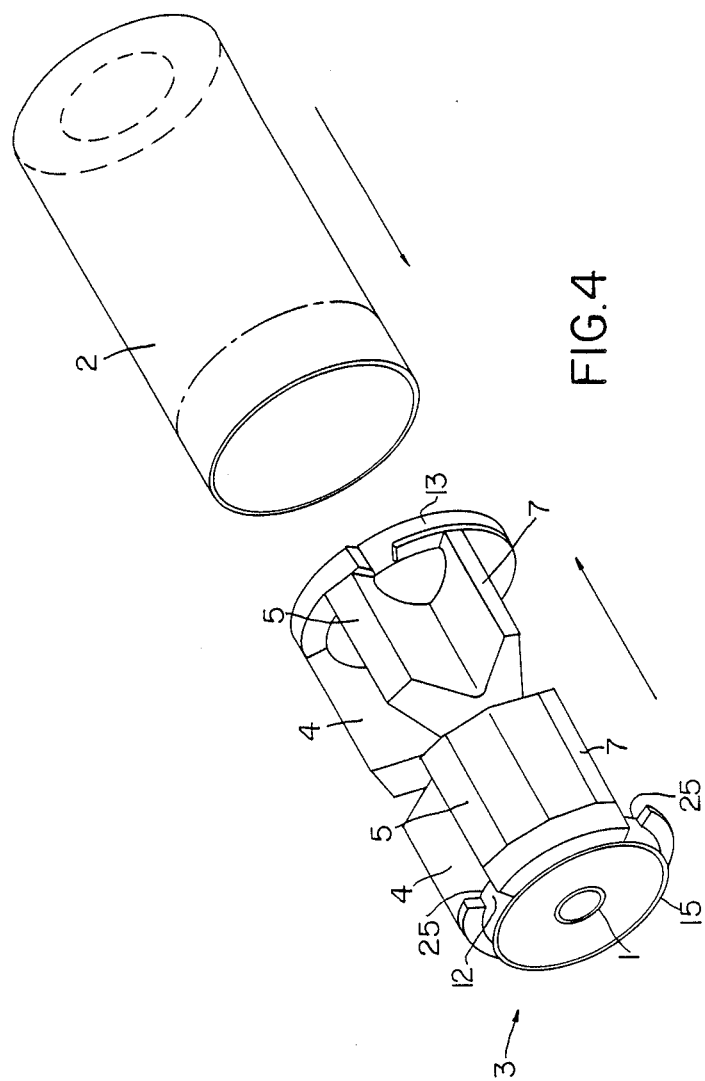
FIG. 4 shows the insertion of an embodiment of the resilient rubber body including the inner sleeve into the outer sleeve.

The insertion of the rubber body shown in FIGS. 2 and 3 into the outer sleeve 2 is illustrated by FIG. 4. To achieve a complete filling of the chambers with fluid, the assembly is best performed in the submerged state.

The outer sleeve 2 comprises a tube of metal. It has at the right end an inwardly turned flange which can be produced, for example, by rolling. The left end is axially open, so that the rubber body 3, including the inner sleeve 1 bonded therein by vulcanization, can be inserted until its right end abuts against the flange of the outer sleeve. The relative displacement is continued until, in addition to a resilient radial constriction of the webs 4, 5, 6 and 7, their confronting end surfaces 30 become pressed against one another. The assembly is completed by producing an internal flange also at the left end of the outer sleeve 2. The flange can be the same as the annular flange already present on the right end. In the end it sealingly contacts the axial edge of the front supporting ring 15 the same as the flange present at the right end of the outer sleeve contacts the additional end ring 15 at that end. The individual chambers and connecting openings of the encapsulated rubber cushion ready for operation are thereby not only completely filled with fluid, but are also sealed against the escape of fluid. Direct placement in operation is therefore immediately possible.

Figure 5:
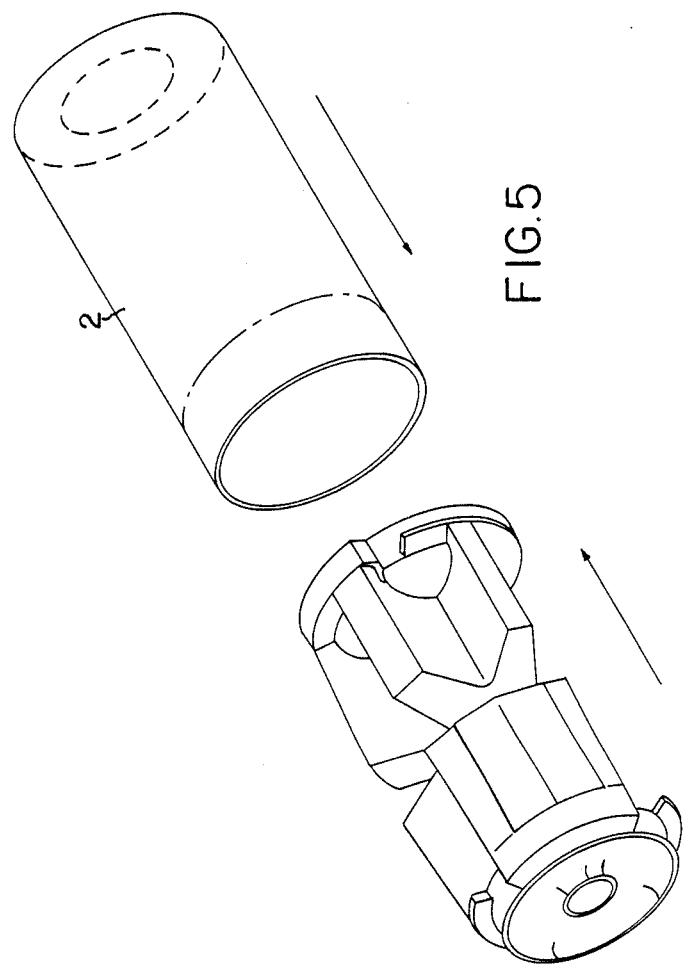
FIG. 5 shows the insertion of another embodiment of the resilient rubber body including the inner sleeve into the outer sleeve.
Figure 6:
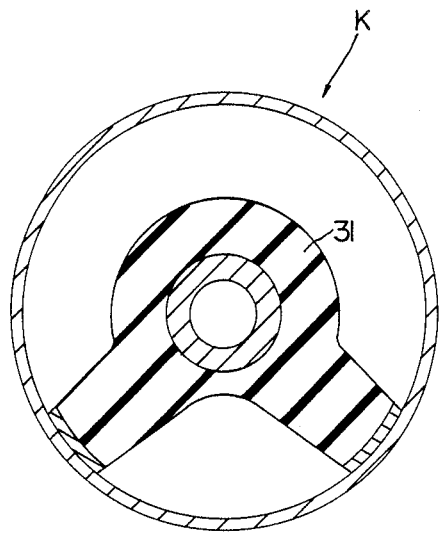
FIGS. 6 to 11 represent other cross-sectional configurations of the resilient body of the encapsulated rubber cushion.

The assembly operation shown in FIG. 5 corresponds in every detail to that described above. In this case, however, a resilient body of rubber is used in which the webs increase in radial length from the ends toward the center of the resilient body. In comparison to the assembly operation described above, therefore, there will be a greater radial compression in the middle portion.

FIGS. 6 to 11 are cross sections of different versions of ready-to-operate encapsulated rubber cushions under load. The sleeves surrounding one another in the embodiments in FIGS. 6 to 9 are formed of tubes and are of rotationally symmetrical shape. In the embodiments according to FIGS. 10 and 11, only one of the sleeves is made from a round tube while the other sleeve has a non-rotationally symmetrical surface on the side adjacent the resilient body. Any undesired relative circumferential displacement of the directly adjacent resilient body of rubber is thereby effectively prevented. Furthermore, on account of the nonparallel association of the confronting surfaces of the sleeves the possibility is created of adjusting the springing rates of the individual webs in a controlled manner. Furthermore, in the embodiment according to FIG. 11, the advantage is achieved of a simplified attachment of he outer sleeve to the adjacent machine part, e.g., the body of a motor vehicle. In this case the outer sleeve comprises a rectangular tube which is defined in four directions by planar outside surfaces. The welding or screwing of the encapsulated rubber cushions to load-bearing structures is thereby facilitated. For the achievement of like effects it may be recommendable to provide a relief texture on at least one of the confronting surfaces, for example in the direction of the axis of the encapsulated rubber cushion. In this case, then, the result will be areas of different diameter succeeding one another axially.

The resilient rubber bodies used in the embodiments according to FIGS. 6 to 11 have a variety of cross sections. In the embodiment according to FIG. 6 the two sleeves are joined together by only two webs which form between them an angle of about 90°.

In the loading plane an abutment buffer 31 is provided to limit the maximum deflection. It is associated with the profile of each of the two webs at an angle of about 135°.

Figure 7:
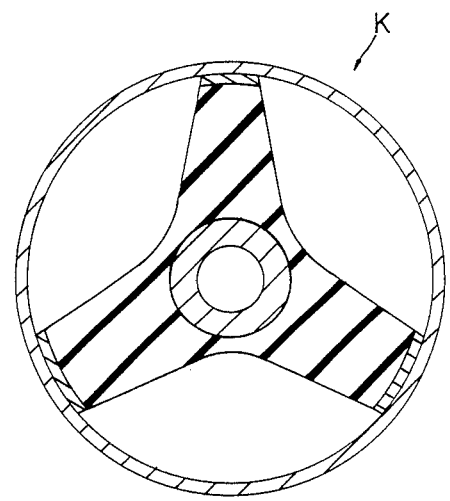

In the embodiment according to FIG. 7, three webs are provided which are uniformly distributed on the circumference. One of these webs has a central plane which is disposed in the loading plane. It has a reduced cross section.

Figure 8:
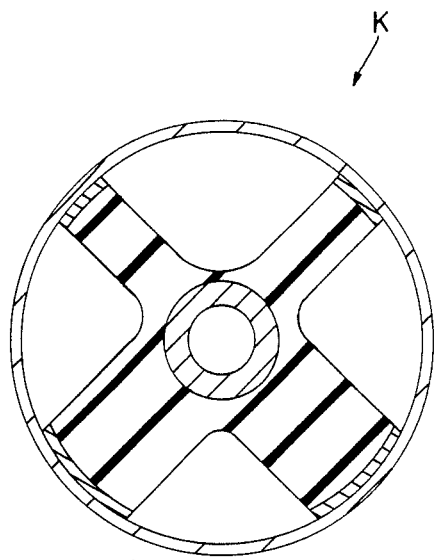

FIG. 8 shows an embodiment in which the individual webs are again uniformly distributed on the circumference. The lower two webs, however, extend over more of the circumference than the upper webs. The result is the desired relative displacement of the inner sleeve during th upward compression anticipated according to the invention.

Figure 9:
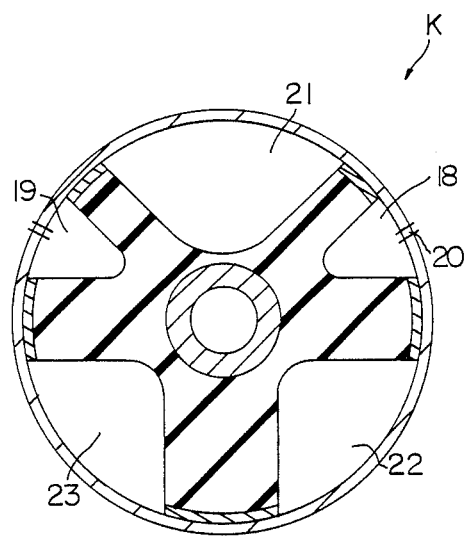
Figure 10:
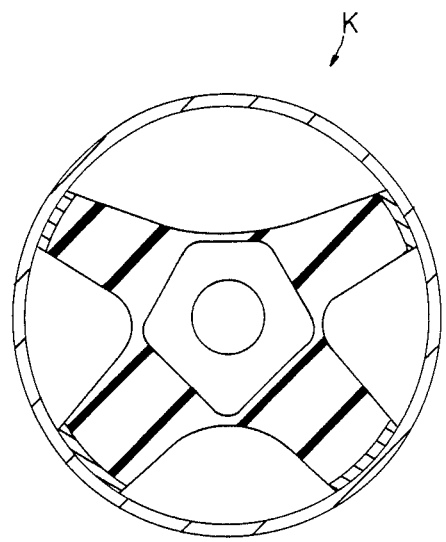
Figure 11:
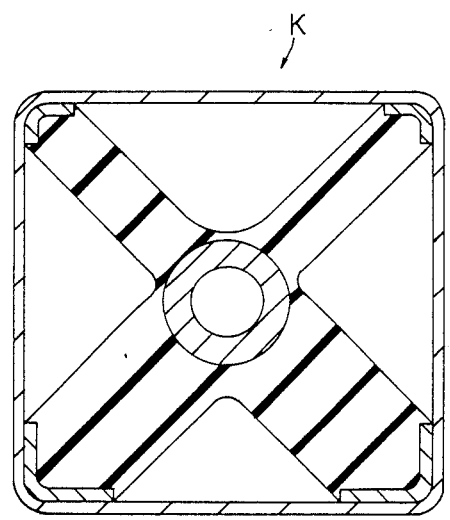

A similar effect results during the compression anticipated according to the invention in the embodiment according to FIG. 9. In this case five webs are distributed on the circumference of the encapsulated rubber cushion, the lowest of which extends over the largest part of the circumference, followed by the two opposite webs which extend horizontally, and finally by the two upwardly pointing webs which extend over the least portion of the circumference of all the webs. The embodiment assures an especially precise guidance of the two sleeves transversely of the chief direction of application of the forces to be accommodated. Furthermore, the above-described construction has a positive effect on a kind of fluid damping which is created by the fact that the fluid-filled chambers 22 and 23 are connected to the fluid-filled chamber 21 by a connecting passage producing a damping effect.

Also the air-filled cavities 19 have a positive effect on this. They are connected to the atmosphere through throttle openings 20 of narrow cross section.

Figure 12:
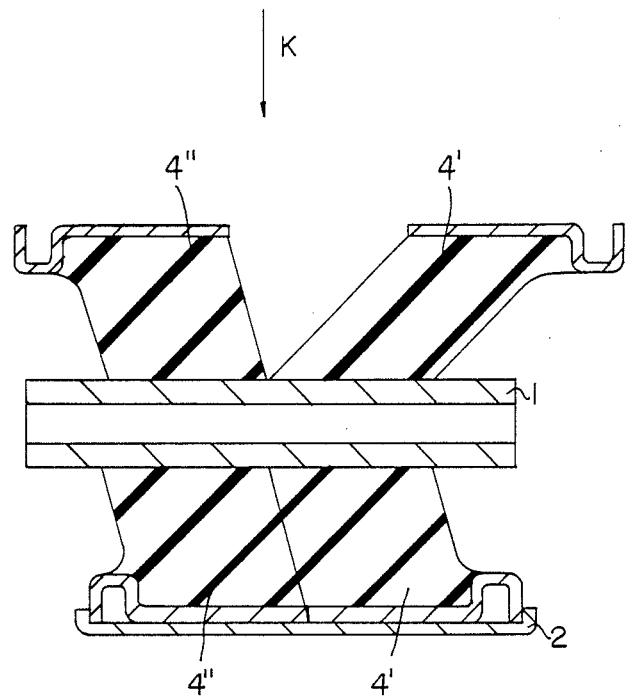
FIGS. 12 and 13 show two embodiments of encapsulated rubber cushions in which the resilient body is divided axially such that during its compression a relative displacement of the two supporting halves in the axial direction will result.
Figure 13:
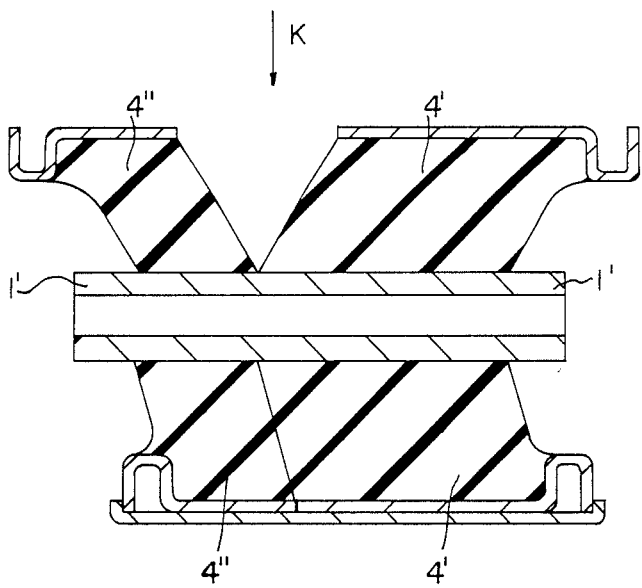

In FIGS. 12 and 13, two different embodiments of resilient bodies are shown in longitudinal cross section, the drawings being made so as to show the resilient body in the uncompressed state in the upper part and in the compressed state in the lower part of the figure. These embodiments can be applied with one or an of the above-described cross-sectional shapes.

In the case of the embodiment according to FIG. 12, the webs of the resilient body are divided in the center, the division being such that the web 4' shown on the left is associated before its compression with the inner sleeve 1 at a steeper angle than the web 4' shown in the right part of the drawing. The bias caused by the compression in the resilient body is thereby unbalanced in the axial direction and configured such that greater forces can be introduced into the inner sleeve 1 of the assembled encapsulated rubber cushion which are more effective in one direction rightward than in the opposite direction. In addition, a bias in the radial direction is produced. Such an encapsulated rubber cushion can therefore give the connected machine element a good guidance and relative mobility not only in the radial direction but also in the axial direction.

The embodiment according to FIG. 13 is similar as regards its basic construction to the embodiment according to FIG. 12 described above. In this case, however, the web portions 4" and 4' are of different length, so that the ability of the assembled encapsulated rubber cushions is greater with regard to forces which are introduced in the rightward direction into the inner sleeve 1 than in the case described above. The radial bias is the same as described above.

Such an embodiment is excellently suited for applications in which a great radially directed static load is superimposed on an especially high, axially directed, static load. Such an application is to be found, for example, in the axle suspension of a motor vehicle. Due to the axially divided construction of the inner sleeve and of the two resilient bodies bonded thereto, manufacture is especially simple. It consists of two sleeve portions 1' which are joined together in the plane of separation of the web portions 4' and 4" in a liquid-tight manner by means of a press fit.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An encapsulated rubber cushion having a longitudinal axis and adapted to be stressed chiefly perpendicular to its axis, comprising:

two sleeves one around the other in an axially parallel relationship and a resilient body of rubber disposed between them which contacts the outer of the sleeves with at least two webs projecting substantially in the radial direction, the webs being associated with an imaginary perpendicular plane erected in the axis of the sleeves and together with terminal end walls and the outer of the sleeves defining at least partially liquid-filled chambers which are connected at least partially by connecting openings, the webs being compressed together resiliently between the two sleeves to a breadth that is smaller than the breadth in which they were manufactured, and the webs being compressed in the axial direction to a length that is shorter than the length in which they were manufactured, and the webs being produced in the form of pairs of partial webs which have an axial distance from one another which increases radially outwardly, and the distance being substantially eliminated in the assembled encapsulated rubber cushion by a pressing against one another of the pairs of partial webs.

2. An encapsulated rubber cushion according to claim 1, in which the webs are compressed radially to a breadth that is smaller than the breadth in which they were manufactured.

3. An encapsulated rubber cushion according to claim 1, in which the webs are so constructed that the resultant force caused by the compression, which is opposed to the static load that is to be accommodated, is greater than the resultant force caused by the compression, which is acting in the direction of the load to be accommodated.

4. An encapsulated rubber cushion according to claim 1, in which the webs are provided on the surface facing outward in the radial direction with metal facings.

5. An encapsulated rubber cushion according to claim 4, in which the metal facings comprise sheet metal and the facings are externally adapted to the shape of the inside of the outer sleeve.

6. An encapsulated rubber cushion according to claim 1, which includes metal end rings and in which in the area of the terminal walls the webs are affixed to metal end rings and in which the outer sleeve reaches with projections around the side facing away from the webs.

7. An encapsulated rubber cushion according to claim 6, which includes metal end rings and in which the facings and at least one of the end rings are integrally joined together.

8. An encapsulated rubber cushion according to claim 7, in which the end rings together with the outer sleeve define annular channels and in which the annular channels form a component of the connecting openings.

9. An encapsulated rubber cushion according to claim 8, which includes at least two different pairs of chambers connected in a fluid-carrying manner by the annular channels.

10. An encapsulated rubber cushion according to claim 1, in which from their manufacture the webs have a greater radial width in the middle part of their axial length than at their ends.

11. An encapsulated rubber cushion according to claim 1, which includes two webs disposed below the center line of the inner one of the sleeves and two of the webs disposed above the center line of the inner one of the sleeves and in which the two webs disposed below the center line have a greater thickness than the two webs disposed above the center line.

12. An encapsulated rubber cushion according to claim 11, which includes four webs and in which the lower webs include with one another an angle of 30° to 60° and the upper webs include with one another an angle of 120° to 150°.

13. An encapsulated rubber cushion according to claim 1, in which the axial distance forms a gap which opens outwardly substantially V-wise between each pair of partial webs, the gap being approximately in the middle part of the axial length of the webs.

14. An encapsulated rubber cushion according to claim 13, in which the gap has a profile associated at an angle with the axis of the encapsulated rubber cushion.

15. An encapsulated rubber cushion according to claim 14, in which the partial webs of a pair have a length different from one another in the direction of the axis of the encapsulated rubber cushion.

* * * * *